United States Patent Office 3,519,703
Patented July 7, 1970

3,519,703
FLUOROELASTOMER COMPOSITIONS WITH IMPROVED LOW TEMPERATURE PROPERTIES
Bernard A. Merkl, Detroit, and Pauls Davis, Gibraltar, Mich., assignors to Wyandotte Chemicals Corporation, Wyandotte, Mich., a corporation of Michigan
No Drawing. Filed Aug. 18, 1966, Ser. No. 573,188
Int. Cl. C08f 29/16
U.S. Cl. 260—897                               3 Claims

ABSTRACT OF THE DISCLOSURE

Fluorine containing elastomeric compositions of improved properties are prepared by covulcanizing a fluorine containing elastomer and minor amounts of a hydrocarbon rubber.

This invention elates to new chemical compositions and more particularly to rubber-like materials containing fluorine-containing elastomers compounded with hydrocarbon rubbers.

Fluorine-containing polymers are known to possess many useful applications by reason of their relative chemical inertness, high physical strength and solvent resistance. By virtue of these properties, such fluorine-containing polymers, or copolymeric compositions, can be fabricated into a wide variety of useful articles having improved chemical and physical stability, or in the form of protective coatings on the surfaces of a wide variety of useful articles. In connection with these uses, it is also desirable, in many instances, for these fluorine-containing polymers to possess elastomeric properties so that a high degree of flexibility, elasticity and extensibility is obtained and which can be easily vulcanized and processed. However, there have been certain applications in which the fluorine-containing polymers have not been satisfactory. In extreme low temperature applications, such as found in spacecraft and cryogenic uses, fluorine-containing polymers have not been found to have the needed low temperature flexibility. In fact, at about minus 40° C. the fluorine-containing polymers exhibit low temperature brittleness that results in the fluorine-containing polymers cracking.

It is, therefore, an object of this invention to provide new and useful compounds containing fluorine-containing polymers and other polymeric materials having desirable chemical and physical characteristics. Still another object of this invention is to provide new and useful compounded synthetic elastomers that have good physical properties, including improved brittle point temperatures. A still further object is to obtain rubbers that have improved low temperature properties.

Various other objects and advantages inherent in the invention will become apparent to those skilled in the art from the accompanying description and disclosure.

The compounds of this invention may, for example, be used for weather seals, window strips and channels, packings, bushings, grommets, gaskets, sealing rings, etc.

In accordance with this invention, it has been found that the low temperature properties of fluoroelastomer compositions can be substantially improved by incorporating and co-curing varying amounts of hydrocarbon rubbers in the fluorine-containing polymers. Suitable curing agents are used to accomplish co-vulcanization.

It has been found that by incorporating from about 5 to about 40 parts by weight of hydrocarbon rubber per 100 parts by weight of fluourine-containing elastomer, a rubber having improved low temperature properties can be obtained.

The fluorine-containing polymers used within the scope of this invention are made from haloolefins having a high degree of fluorine substitution. Among the haloolefins which may be used as monomers in preparing the polymers are monochlorotrifluoroethylene, dichlorodifluoroethylene, hexafluoropropylene, chlorodifluoroethylene, 2,3-dichloro-1,1,4,4,4-pentafluorobutene - 2-trifluoroethylene, hexafluorobutene-2, tetrafluoroethylene, 2-trifluoromethylhexafluoropropylene, 2 - chloropentafluoropropylene, trifluoropropylene, and trichlorotrifluoropropylene. It is to be understood that mixtures of the aforementioned monomers can be used to prepare copolymers.

Hydrogen-containing monoolefins may also be used as comonomers with the above haloolefins in preparing copolymers. Examples of suitable hydrogen-containing monoolefins include vinylidene fluoride, vinyl fluoride, ethylene, chlorofluoroethylene, dichloroethylene, vinyl chloride, and 2-trifluoromethylethylene.

Of these, the most advantageous copolymers are chlorotrifluoroethylene and vinylidene fluoride; tetrafluoroethylene and vinylidene fluoride; tetrafluoroethylene and chlorofluoroethylene; and hexafluoropropylene and vinylidene fluoride.

The aforementioned monoolefinic compounds may be copolymerized in any proportions, depending on the characteristics desired in the fluoroelastomer. Good chemical stability requires fluorine substitution of at least one-half of the possible positions for such substitution in the polymer chain. The preferred copolymer is the linear addition product of vinylidene fluoride and hexafluoropropylene.

It is to be noted that all the monomers enumerated above contain only carbon, hydrogen and halogen atoms, and therefore produce coploymers substantially without markedly reactive functional groups. This, of course, does not preclude the presence of other atoms in end groups which might be formed by chain stoppers in the polymerization zone, present by design or by accident. Such end groups are relatively few in number and difficult to detect.

The polymerization reaction involving the above monomers may be carried out in any well-known method such as a water suspension type system or in a mass polymerization system. For example, suitable methods are described in U.S. Pat. 2,966,482 issued to Bolstad et al. on Dec. 27, 1960 and U.S. Pat. 3,069,401 issued to Gallagher on Dec. 18, 1962.

The hydrocarbon rubbers that may be compounded with fluorine-containing polymers within the scope of this invention include, among others, rubbers having the following monomer units: 1,3-butadiene, 2-methyl-1,3-butadiene, 2,3-dimethyl-1,3-butadiene and 2-methyl-1-propene. The hydrocarbon rubbers may also be copolymers or terpolymers such as an ethylene-propylene copolymer having the structural unit

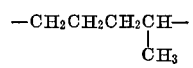

butadiene-styrene copolymer with repeating units of

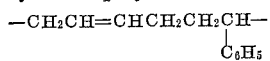

ethylene-propylene-butadiene terpolymer with units of

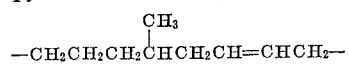

propylene-ethylene-butadiene terpolymer containing units of

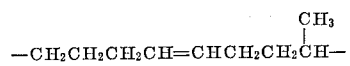

ethylene-butylene copolymer with repeating structural units

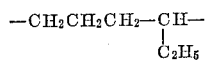

and isobutylene-isoprene. The preferred hydrocarbon rubber is the copolymer of ethylene and propylene and generally designated by the capital letters EPR (ethylene-propylene rubber). The ethylene-propylene copolymer should, for best results, contain from about 50 to 75 mole percent ethylene.

The addition of the hydrocarbon rubbers to fluorine-containing elastomers can be accomplished by any means heretofore developed for rubber compounding. Thus, the hydrocarbon rubber may be added to the fluorine-containing polymer in a rubber compounding mill, in a Banbury mixer or a mixing extruder in which the hydrocarbon rubber is uniformly distributed throughout the fluorine-containing polymer. The mixing operation may be carried out at a temperature above the melting point of the polymer. However, it is preferred to blend the two polymers in the solid state along with the curing agent.

The mixed fluorine-containing polymer and hydrocarbon rubbers can be cured or vulcanized in any convenient way. The curing of the compositions of this invention may be accomplished by using a free radical forming promoter, such as the organic peroxy compounds and azo compounds, or an ionic promoter. In practicing the invention, it is preferred that the mixture to be cured be compounded with a peroxide in conventional amounts (e.g., about 1 to 5 parts per 100 parts by weight of fluoroelastomer) and with an accelerator if desired. In general, any conventional peroxide curative, whether organic or inorganic, may be used. Examples of suitable peroxy compounds are disclosed in U.S. Pat. 2,833,752, Honn et al., issued May 6, 1958. The peroxides employed are relatively stable at the temperature at which the elastomer is conventionally compounded, that is, the peroxide is relatively stable at temperatures below about 50° C. Benzoyl peroxide is preferred, but good results are also obtainable with ditertiary-butyl peroxide at slightly higher curing temperatures. Less preferred are butyl hydroperoxide, dicumyl peroxide, calcium peroxide, and sodium peroxide. Tertiary-butyl perbenzoate, 2,2-di(tertiary-butyl peroxy) propane and 2,2-di(tertiary-butyl peroxy) butane may also be mentioned. Tertiary-butyl peracetate, succinic acid peroxide, or hydrogen peroxide may also be used. The peroxide cure is also preferably activated with the aid of metal oxides such as magnesium, zinc, calcium, aluminum and lead oxide, and lead salts, such as dibasic lead phosphite, triabasic lead maleate, and tribasic lead sulfate. Zinc oxide is especially preferred, since it imparts smooth processing characteristics along with minimum scorching tendencies. These accelerators may be used in conventional, noncritical amounts, e.g., 3 part or more, preferably about 10 parts per 100 parts by weight of the fluoroelastomer, although very large amounts, such as 50 or more parts, may be used to function as a filler or pigment. The vulcanizable mixture may further contain various other suitable conventional compounding ingredients if desired, such as fillers (e.g., precipitated silica, zinc oxide, carbon black), softeners or plasticizers.

The vulcanization may be carried out in a mold or press in accordance with conventional compression or injection molding procedures, or the suitably preformed (e.g., molded, extruded, or calendered) elastomer may be cured in an oven or autoclave under vacuum at atmospheric or elevated pressure in an atmosphere of nitrogen or any suitable inert gas. The curing conditions may vary widely, depending on the exact quantity and kind of curing materials, and depending on the exact properties and degree of cure desired in the final article, and also depending on the particular equipment and procedure used, as well as the size of the article and other variables. In general, it may be stated that useful cures are obtainable over much the same time and temperature ranges as may be employed in ordinary rubber vulcanization, e.g., curing times of from about 5 minutes to 24 hours at temperatures of from about 80° to 220° C., the longer times being employed with the lower temperatures. The preferred synthetic rubber composition within the scope of this invention comprises about 100 parts by weight of a copolymer of vinylidene fluoride and hexafluoropropylene co-cured with from about 10 to 30 parts by weight of a copolymer of ethylene and propylene.

The invention is further illustrated by the following examples:

EXAMPLES I–V

The specimens in Examples I to V were compounded by mixing in the solid state 100 parts by weight of a vinylidene fluoride-hexafluoropropylene copolymer, 3 parts by weight of a curing agent, benzoyl peroxide and 0, 10, 20, 30 and 40 parts by weight, respectively, of an ethylene-propylene rubber. These specimens were covulcanized by undergoing a press cure at 130° C. and then a 24-hour post cure at 200° C. The results of the physical tests are shown in the tabulation below. The amount of the ingredients are given in parts by weight based upon 100 parts by weight of vinylidene fluoride-perfluoropropene copolymer.

| Ingredients | I | II | III | IV | V |
|---|---|---|---|---|---|
| VFHFP [1] | 100 | 100 | 100 | 100 | 100 |
| EPR [2] |  | 10 | 20 | 30 | 40 |
| Benzoyl peroxide | 3 | 3 | 3 | 3 | 3 |
| Physical properties | I | II | III | IV | V |
| Tensile strength, p.s.i. | 1,237 | 1,118 | 606 | 430 | 500 |
| 100% modulus, p.s.i. | 195 | 209 | 217 | 212 | 353 |
| 300% modulus, p.s.i. | 316 | 454 | 392 | 362 |  |
| Percent elongation | 540 | 600 | 450 | 400 | 300 |
| Shore "A" hardness (inst.) | 60 | 60 | 60 | 60 | 64 |
| Shore "A" hardness (5 sec.) | 54 | 56 | 54 | 53 | 57 |
| Percent swelling | 364 | 417 | 378 | 355 | 328 |
| Brittleness temp., ° C.[3] | −50 | −70 | −73 | −67 | −65 |

[1] Vinylidene fluoride-hexafluoropropylene copolymer.
[2] Ethylene-propylene rubber.
[3] Acetone used as solvent.

Examples I to V show that the 100% modulus, 300% modulus and the brittleness temperature of a fluorine-containing elastomer are substantially improved by co-curing with a hydrocarbon rubber. It is also apparent that the percent elongation, Shore "A" hardness and percent swelling of the fluorine-containing elastomer are not detrimentally affected by the hydrocarbon rubber.

EXAMPLES VI–X

This series of specimens was compounded containing from 15 to 25 parts of ethylene-propylene rubber per 100 parts of vinylidene fluoride-hexafluoropropylene copolymer. These specimens were press-cured for one hour at 130° C. In order to avoid or minimize surface oxidation the specimens were post-cured at 200° C. while they were still in the press in their molds. Flashing around the edges of the rubber samples served as a seal to prevent air from getting to the samples while at the relatively high curing temperature. The amounts of the ingredients are given in parts by weight based upon 100 parts by weight of fluorine-containing polymer. The results of the physical tests are shown in the tabulation below:

| Ingredients | VI[4] | VII | VIII | IX | X[6] |
|---|---|---|---|---|---|
| VFHFP[1] | 100 | 100 | 100 | 100 | 100 |
| Magnesium oxide | 15 | | | | |
| Thermax[5] | 25 | | | | |
| Hexamethylene diamine | 1 | | | | |
| EPR[2] | | 15 | 20 | 25 | 15 |
| Benzoyl peroxide | | 3 | 3 | 3 | 3 |
| Physical properties | VI[4] | VII | VIII | IX | X[6] |
| Tensile strength, p.s.i | 1,490 | 856 | 607 | 470 | 1,011 |
| 100% modulus, p.s.i | 1,208 | 131 | 158 | 163 | 231 |
| 300% modulus, p.s.i | | 233 | 276 | 295 | 439 |
| Percent elongation | 124 | 689 | 598 | 485 | 678 |
| Shore "A" hardness | 75 | 59 | 55 | 56 | 59 |
| Brittleness temp., °C.[3] | −50 | −75 | −76 | −75 | −75 |

[1] Vinylidene fluoride-hexafluoropropylene copolymer.
[2] Ethylene-propylene rubber.
[3] Isooctane used as solvent.
[4] Cured in carbon dioxide atmosphere.
[5] Soft, semi-reinforcing finely divided carbon.
[6] Cured in carbon dioxide atmosphere. Surface appeared to have undergone some charring at this curing temperature.

Examples VII to X show that within the preferred range (about 10 to 30 parts of hydrocarbon rubber per 100 parts by weight of the fluorine-containing elastomer), the physical properties of the composition remained relatively uniform.

EXAMPLES XI to XII

Three specimens were prepared containing 100 parts by weight vinylidene fluoride-hexafluoropropylene copolymer, 3 parts by weight benzoyl peroxide and 15, 20 and 25 parts by weight, respectively, of ethylene-propylene rubber. These specimens were press-cured for one hour at 130° C. The specimens were then inserted into metal containers while still in their molds. The containers were sealed with silver solder, tested for leaks, and then inserted into a press for heating to 200° C. While the specimens were being heated, the metal containers surrounding the curing rubber were evacuated to 1 mm. pressure. The evacuation of the containers was continued for 24 hours while the system was maintained at 200° C.

The physical appearance of the resulting samples was much improved over that of the press-cured ones in air at 200° C. The specimens appeared free of any effects of surface oxidation, were tan in color, were flexible and quite tough. The effect of solvents, at room temperature on the vacuum-cured specimens was diminished markedly as compared to the air-cured specimens.

It is also contemplated that rubbers within the scope of this invention may also be cured in an inert gas atmosphere such as nitrogen.

What is claimed is:

1. A synthetic rubber composition which is the covulcanizate of 100 parts by weight of a fluorine-containing elastomer selected from the group consisting of:
    (a) the copolymer of monochlorotrifluoroethylene and vinylidene fluoride, and
    (b) the copolymer of vinylidene fluoride and hexafluoropropylene and from about 5 to about 40 parts by weight of a hydrocarbon rubber.

2. The composition of claim 1 wherein said fluorine-containing elastomer is a copolymer of vinylidene fluoride and hexafluoropropylene and said hydrocarbon rubber is a copolymer of ethylene and propylene.

3. The composition of claim 2 wherein the copolymer of ethylene and propylene comprises from about 10 to 30 parts by weight per 100 parts by weight of said copolymer of vinylidene fluoride and hexafluoropropylene.

References Cited

UNITED STATES PATENTS 2,872,431    2/1959    Harvey et al. _____ 260—890

MURRAY TILLMAN, Primary Examiner

M. J. TULLY, Assistant Examiner

U.S. Cl. X.R.

260—87.5, 890, 41, 41.5